United States Patent Office 3,329,443
Patented July 4, 1967

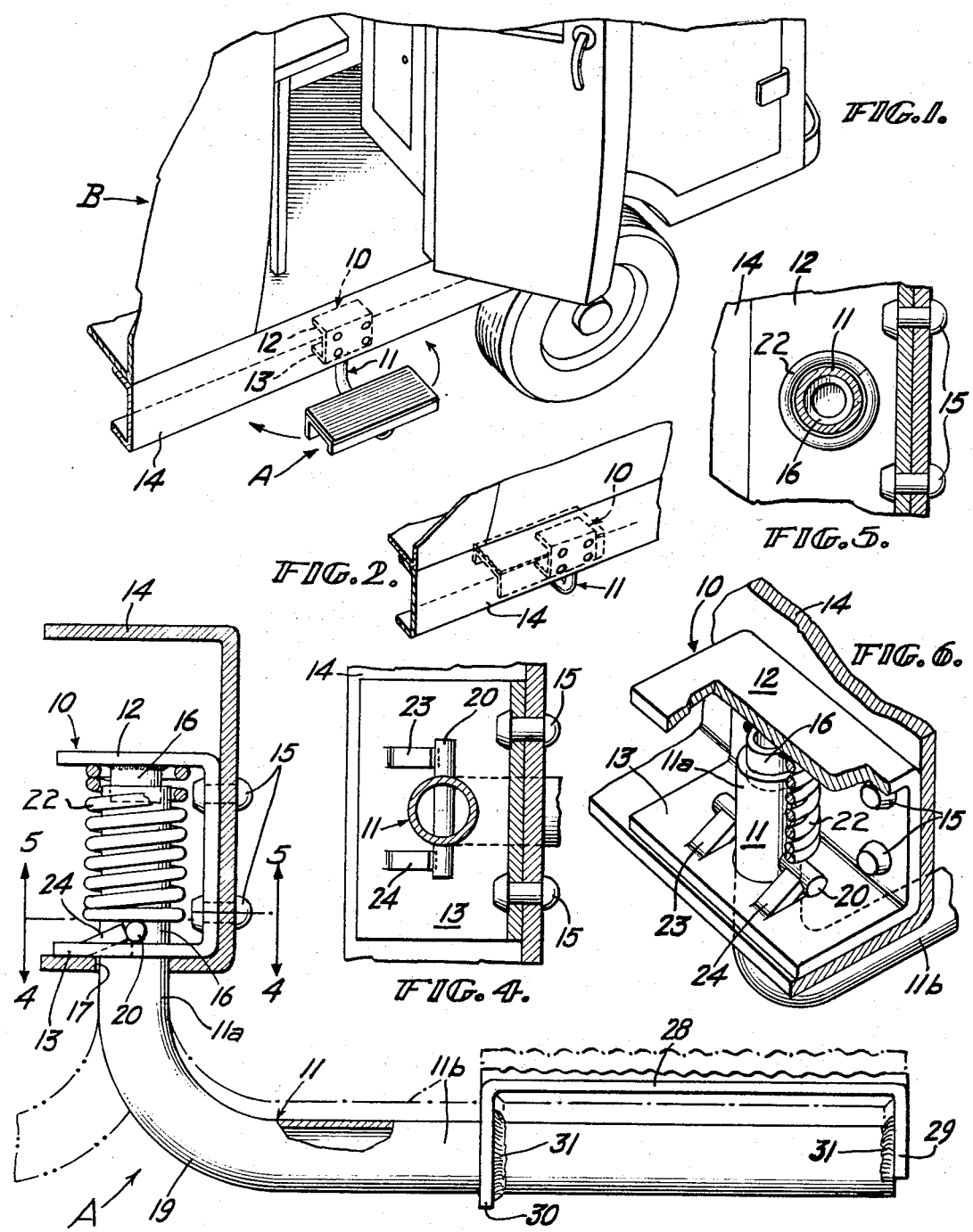

3,329,443
SWING-OUT STEP FOR VEHICLE
Elmo Lowder, 166 Kennedy, Campbell, Calif. 95008, and Cordie S. Oliver, 112 N. Henry Ave., San Jose, Calif. 95117
Filed Mar. 28, 1966, Ser. No. 538,057
5 Claims. (Cl. 280—166)

The present invention relates to a step, and pertains more particularly to a swing-out step for use on automotive vehicles such as campers.

In recent years there has been a great increase in the use of automobiles of the type having a van-type body on a light truck type chassis, and with the interior of the body arranged with a small galley, dinette and bed-settee so that the vehicle can be used for camping and vacation trips.

In most such vehicles, which are referred to generally as "campers," the entrance is through a fairly large door in the side of the vehicle, so that any step which is used for ingress and egress must be retracted before the vehicle is driven, as it would be dangerous if it were allowed to project laterally from the vehicle.

The present invention provides an improved, swing-out type of step for a vehicle wherein a bracket is provided for mounting on the inner side of a frame member of the vehicle, and a step is mounted on an angularly bent arm, an upright portion of the arm being swiveled in the bracket and releasably retained in either of two swiveled positions 180° apart. A spring prevents accidental swiveling of the step support arm, when it is in either its swung-out, operative position, or its swung-in, retracted position.

An object of the invention is to provide an improved, swing-out step for use on an automotive vehicle.

Another object of the invention is to provide an improved, swing-out step for an automotive vehicle wherein a mounting bracket is provided for mounting on the frame of such vehicle, an arm is pivoted in the bracket and has a laterally projecting step thereon, spring latch means being provided to retain the step in either a swung-out position where it projects beyond the vehicle body for use, and a swung-in position where it is retracted within the confines of the body.

The foregoing objects and advantages of the invention will be apparent from the following description and the accompanying drawings, wherein:

FIG. 1 is a fragmentary, perspective view of a portion of a "camper" type automotive vehicle with a step embodying the invention mounted thereon and swung outwardly to operative position.

FIG. 2 is a fragmentary, perspective view similar to FIG. 1, but showing the step swung inwardly 180° to its stowed condition.

FIG. 3 is an enlarged, vertical, sectional view through the automobile frame member upon which the invention is mounted, the step being shown in solid lines in its swung-out position of FIG. 1, the dash-one-dot lines showing the step support arm raised to release the retaining latch, and the dash-two-dot lines showing the step support arm swung inwardly to its retracted condition of FIG. 2.

FIGS. 4 and 5 are sectional views taken along lines 4—4 and 5—5, respectively, of FIG. 3.

FIG. 6 is a fragmentary, perspective view of the portion shown in FIGS. 4 and 5.

Referring to the drawings in detail, an illustrative embodiment of A of the invention comprises a channel type mounting bracket 10, which may be of steel plate of suitable strength and thickness. A step support arm 11 has a right angle bend 19 therein and the upper portion 11a of the arm above the bend 19 is fitted for swivel movement in a hole provided therefor in the lower flange 13 of the channel bracket 10. A pivot stud 16 is secured as by welding to the under side of the upper flange 12 in axial alignment with the hole in the lower flange 13 for the upper support arm portion 11a, and the upper end of the upper support arm portion 11a fits telescopically onto this pivot stud.

The bracket 10 is illustrated fits into a channel side frame member 14 of a camper vehicle B, and is secured in position therein by rivets 15. A hole 17 (FIG. 3) is drilled in the bottom flange 18 of the side frame channel 14 to register with the hole in the bracket bottom flange 13, but if desired the bracket 10 can be mounted, by the use of conventional spacing or other means obvious to an ordinarily skilled mechanic, so as to position the upper support arm portion 11a inwardly clear of the frame channel 14.

A support and latching pin 20 is fitted into a hole provided therefor diametrically through the upper support arm portion 11a, and is retained therein as by means of a press fit. A coil spring 22 surrounds the upper portion 11a of the arm 11 above the pin 20, and is held in compression between the pin 20 and the upper flange 12 of the mounting bracket 10.

Stop and positioning means comprising a pair of angularly upwardly offset tabs 23 and 24 are severed from the bottom bracket flange 13, and their upper faces are inclined upwardly to provide cam surfaces which act on the pin 20 when the step A is swung rotatively in either direction to elevate the pin 20 and the support arm 11 through which it is inserted. The free ends of the tabs 23 and 24 are positioned to allow the pin 20, under the bias of the spring 22, to fit downwardly alongside them, and these ends preferably slope slightly as best shown in FIG. 3 so as to cam the pin 20 laterally against the bracket flange 13 and thus secure the support arm 11. This camming action holds the step A securely in either of its two positions of FIGS. 1 and 2.

The lower portion 11b of the step support arm 11 projects at right angles to the upper portion 11a thereof, and a step plate 28, which may be of steel plate of suitable strength and thickness, is mounted thereon to lie substantially horizontally when the bracket 10 is mounted on a vehicle as shown in the drawings.

The illustrated step plate 28 has downwardly bent stiffening flanges 29 and 30 along the inner and outer sides thereof, respectively, and these flanges are secured by welds 31 to the lower support arm portion 11b.

In using the illustrated form of the invention; with the mounting bracket 10 secured in a desired location on an automotive vehicle, for example, as shown in FIG. 1, it is assumed that the step A is initially in its swung-out, operative position of FIG. 1. In this operative position, illustrated also in solid lines in FIG. 3, the pin 20 is securely anchored by the sloping ends of the tabs 23 and 24 to prevent wobble or accidental rotative displacement of the step.

To swing the step to its retracted position of FIG. 2, the step support arm 11 is manually raised to its dash-one-dot position of FIG. 3, thereby raising the pin 20 above the level of the tabs 23 and 24. The step support arm 11 may then be swung in either rotative direction a few degrees about the axis of the upper arm portion 11a, which brings one end or the other of the pin 20 over its adjacent tab 23 or 24 as the case may be. The upward pressure on the step support arm 11 may then be released, as the pin 20 will then ride on such tab, and the step support arm may be swung the remainder of the 180° required to bring it to its retracted position of FIG. 2.

As the step A approaches its fully retracted position, shown in dash-two-dot-lines in FIG. 3, one end of the pin 20 rides up on the sloping cam face of whichever tab 23 or 24 faces it. The cam action of this sloping tab face on the pin 20 elevates the pin over the tab, thereby raising the support arm 11 and further compressing the spring 22. As the pin 20 clears the tab which has thus elevated it, the spring 22, aided by gravity, urges the support arm 11 downwardly, returning the pin 20 to its solid line, latching position of FIG. 3.

A similar procedure is used to swing the step A outwardly to its operative position shown in FIG. 1.

The invention provides a simple, safe, rattle-free, inexpensive, highly utilitarian and satisfactory swing-out step mechanism, and one which is particularly suited for use on automotive vehicles of the camper type.

While I have illustrated and described a preferred embodiment of the present invention, it will be understood, however, that various changes and modifications may be made in the details thereof without departing from the scope of the invention as set forth in the appended claims.

We claim:

1. A swing-out step for an automotive vehicle of the camper type having a side door and having a structural body member below the side door, said step comprising:
   a mounting bracket,
   means for mounting the bracket in upright condition on the structural body member below the vehicle side door,
   a step support arm having a right angle bend therein, the portion of the arm on one side of the bend therein being pivotally mounted for combined swivel and limited axial movement in upright condition on the bracket,
   a step plate mounted in substantially horizontal position on the portion of the support arm on the other side of the bend therein,
   latch means having a pair of rotatively oppositely directed substantially upright faces thereon located with its upright faces spaced slightly from a longitudinal plane through the upright portion of the arm,
   a through-pin inserted diametrically through the upright portion of the arm in position to seat alongside the substantially upright face of the latch means with the step support arm in each of two rotatively adjusted positions 180° apart,
   means limiting downward axial movement of the step support arm to a position wherein the through-pin is laterally opposite and closely adjacent the upright face of the latch means, thereby latching the step support arm against rotative displacement, and
   spring means biasing the step support arm downwardly toward latched position, the spring being of a strength to allow manual upward movement of the step support arm sufficient to raise the through-pin above the latch means to free the support arm for swivel movement to swing the step plate between an operative position laterally beyond the body and a retracted position beneath the body.

2. A swing-out step for an automotive vehicle as defined in claim 1 wherein the bracket is a channel member wherein, in its upright condition the flanges thereof are horizontal and are spaced vertically from each other, and the portion of the step support arm above the bend therein is of circular cross sectional shape which is inserted for pivotal movement in axially aligned support means provided therefor in the bracket flanges.

3. A swing-out latch step for an automotive vehicle as defined in claim 2 wherein the latch means is fixedly secured to the lower flange of the bracket channel.

4. A swing-out step for an automotive vehicle as defined in claim 2 wherein the latch means comprises a pair of tabs stamped from the metal of the lower flange of the bracket channel and both tabs are inclined upwardly therefrom in the same direction, whereby the upper face of one of the tabs acts as a cam to raise the through-pin and the step support arm clear of the latch means upon rotative movement of the step support arm in either direction.

5. A swing-out step for an automotive vehicle as claimed in claim 2 wherein the step support arm is of tubular material, and a pivot stud is secured to the under side of the upper bracket flange and is fitted co-axially within the upper end of the tubular support arm to provide pivotal and limited axially slidable support for the upper end of the step support arm.

References Cited

UNITED STATES PATENTS

| | | | |
|---|---|---|---|
| 1,855,857 | 4/1932 | Harman | 287—14 |
| 2,566,401 | 9/1951 | Bustin | 182—91 |
| 3,266,594 | 8/1966 | Antosh et al. | 280—166 |

BENJAMIN HERSH, *Primary Examiner.*

L. D. MORRIS, *Assistant Examiner.*